US012608704B2

(12) United States Patent
Oh

(10) Patent No.: US 12,608,704 B2
(45) Date of Patent: Apr. 21, 2026

(54) METHOD OF CONTRACTING RESERVES WITH SINGLE TRANSACTION IN RESPONSE TO A PLURALITY OF CONTRACT REQUESTS

(71) Applicant: Zkrypto Inc., Seoul (KR)

(72) Inventor: Hyunok Oh, Seoul (KR)

(73) Assignee: Zkrypto Inc., Seoul (KR)

( * ) Notice: Subject to any disclaimer, the term of this patent is extended or adjusted under 35 U.S.C. 154(b) by 200 days.

(21) Appl. No.: 18/391,635

(22) Filed: Dec. 20, 2023

(65) Prior Publication Data

US 2025/0209449 A1 Jun. 26, 2025

(51) Int. Cl.
*G06Q 20/38* (2012.01)
*G06Q 20/40* (2012.01)
*H04L 9/32* (2006.01)

(52) U.S. Cl.
CPC ..... *G06Q 20/3827* (2013.01); *G06Q 20/3829* (2013.01); *G06Q 20/401* (2013.01); *H04L 9/3218* (2013.01)

(58) Field of Classification Search
CPC ........... G06Q 20/3827; G06Q 20/3829; G06Q 20/401; H04L 9/3218; H04L 9/3239; H04L 9/50
See application file for complete search history.

(56) References Cited

U.S. PATENT DOCUMENTS

2019/0251553 A1* 8/2019 Ma ........................ H04L 9/3239
2019/0251554 A1* 8/2019 Ma ........................ H04L 9/3247
2019/0280880 A1* 9/2019 Zhang ...................... G06F 7/58

FOREIGN PATENT DOCUMENTS

CN 111784483 A * 10/2020 ......... G06Q 30/0607

OTHER PUBLICATIONS

Provisions: Privacy-preserving proofs of solvency for Bitcoin exchanges (Year: 2015).*
Zero Knowledge Proofs: Example with Pedersen Commitments in Monero (Year: 2021).*
EPO, European Search Report issued for European Patent Application No. 23220083.2-1218, Jun. 11, 2024.
(Continued)

*Primary Examiner* — Ali Shayanfar
*Assistant Examiner* — Lawrence Truong
(74) *Attorney, Agent, or Firm* — Nicholas Park

(57) ABSTRACT

The present invention relates to a reserve contract method for generating single transaction in response to a plurality of contract requests. The reserve contract method, performed by at least one processor, includes receiving a plurality of contract requests for a plurality of reserves; obtaining a mid-large commit value based on the plurality of reserves and a plurality of random values using a verify key; generating a hash value based on the mid-large commit value; generating a large reserve value from the plurality of reserves based on the hash value; generating a large random value based on the plurality of random values based on the hash value; obtaining an proof value using the mid-large commit value, the large reserve value, and the large random value using a zero-knowledge proof algorithm; and transmitting the proof value as a transaction. The mid-large commit value has a Pedersen commitment format.

10 Claims, 10 Drawing Sheets

(56)            References Cited

OTHER PUBLICATIONS

Trevor Conley et al., Instant Zero Knowledge Proof of Reserve, Iacr, International Association for Cryptologic Research, Dec. 17, 2023.

Gweonho Jeong et al., Azeroth: Auditable Zero-knowledge Transactions in Smart Contracts, IACR, International Association for Cryptologic Research, May 31, 2022.

Bunz Benedikt et al., Bulletproofs: Short Proofs for Confidential Transactions and More, 2018 IEEE Symposium on Security and Privacy (SP), IEEE, May 20, 2018.

* cited by examiner

FIG. 2

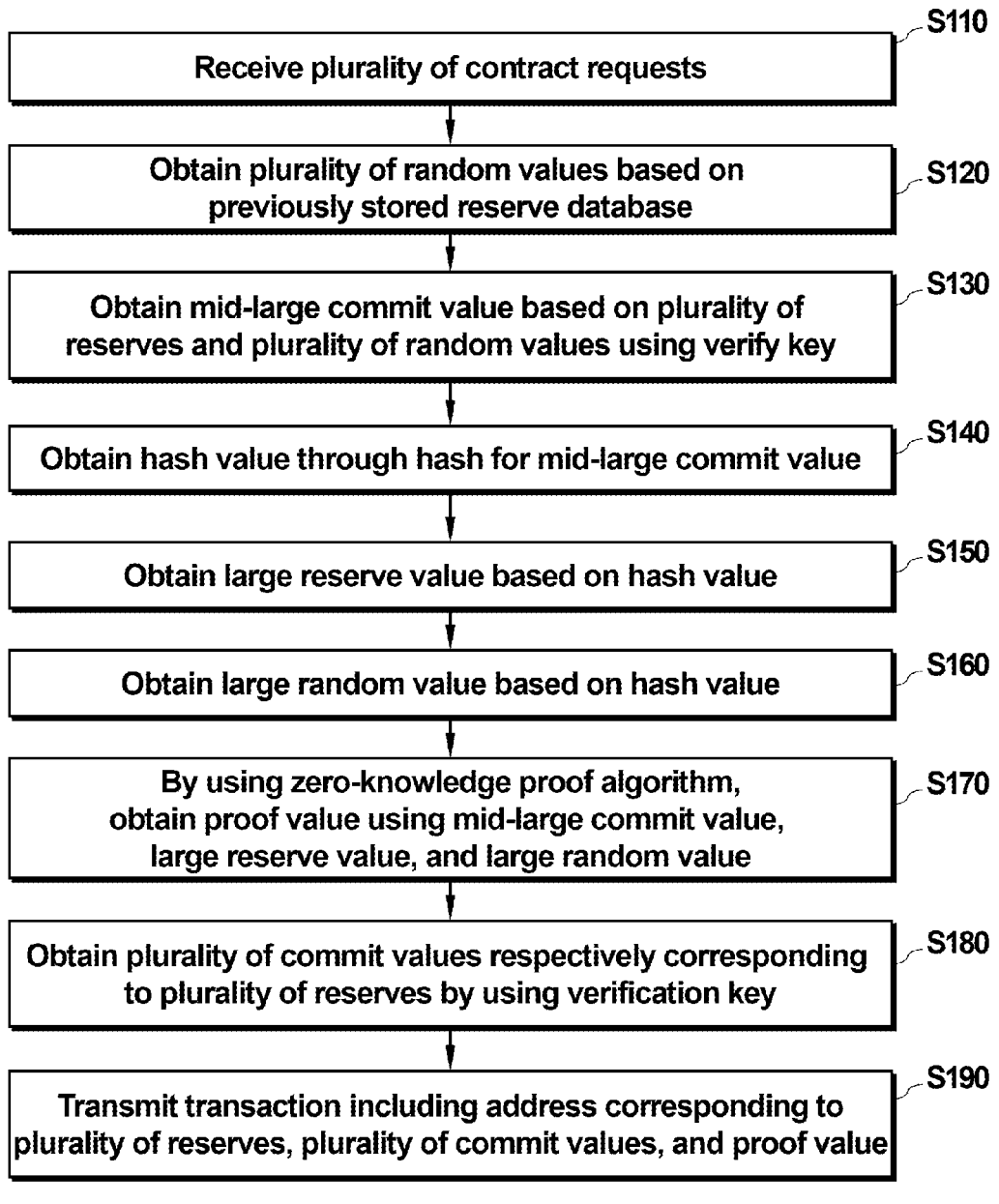

Receive plurality of contract requests    S110

Obtain plurality of random values based on previously stored reserve database    S120

Obtain mid-large commit value based on plurality of reserves and plurality of random values using verify key    S130

Obtain hash value through hash for mid-large commit value    S140

Obtain large reserve value based on hash value    S150

Obtain large random value based on hash value    S160

By using zero-knowledge proof algorithm, obtain proof value using mid-large commit value, large reserve value, and large random value    S170

Obtain plurality of commit values respectively corresponding to plurality of reserves by using verification key    S180

Transmit transaction including address corresponding to plurality of reserves, plurality of commit values, and proof value    S190

S160

Calculate index binary for each of plurality of reserves ⌐S161

Exponentiate hash value correspond to index binary ⌐S162

Multiply exponentiated hash value by corresponding random value and add all multiplied result values to generate large random value ⌐S163

FIG. 6

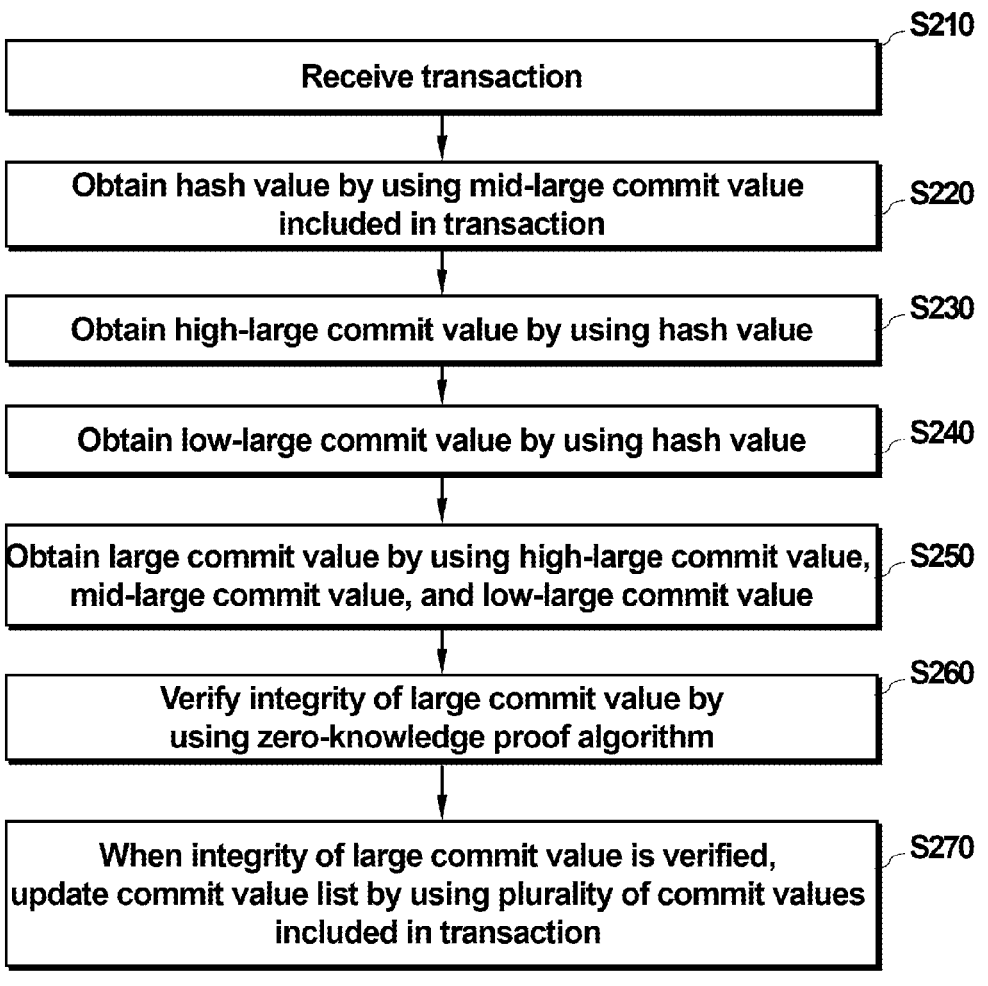

S210
Receive transaction

S220
Obtain hash value by using mid-large commit value included in transaction

S230
Obtain high-large commit value by using hash value

S240
Obtain low-large commit value by using hash value

S250
Obtain large commit value by using high-large commit value, mid-large commit value, and low-large commit value S260
Verify integrity of large commit value by using zero-knowledge proof algorithm S270
When integrity of large commit value is verified, update commit value list by using plurality of commit values included in transaction

S240

Obtain plurality of commit values — S241

Calculate index binary for each of plurality of commit values — S242

Exponentiate hash value based on index binary — S243

Exponentially multiply each of plurality of commit values by exponentiated hash value using tree structure — S244

Obtain low-large commit value by multiplying all exponentially multiplied results — S245

<u>S244</u>

| Arrange plurality of commit values to leaf node | S244_1 |

| Exponentiate commit values, connected to node having even index among i-th level nodes, to hash values exponentiated correspond to level | S244_2 |

| Obtain low-large commit value by multiplying all commit values on which exponential multiplication is performed | S244_3 |

METHOD OF CONTRACTING RESERVES WITH SINGLE TRANSACTION IN RESPONSE TO A PLURALITY OF CONTRACT REQUESTS

BACKGROUND

Technical Field

The present invention relates to a method of contracting reserves generating a single transaction in response to a plurality of contract requests.

Background Art

In finance, a reserve refers to assets held by a company for various purposes, and generally includes purpose to maintain an amount that completely matches the customer deposit. The entity that is entrusted with the deposit according to the deposit transaction of the customer performs the update for the reserve and generates a transaction for reflecting the update in the smart contract. The transaction includes a proof value for proving the reserve, and a zero-knowledge proof algorithm is used to generate the proof value.

The zero-knowledge proof algorithm verifies the integrity of a message (such as a reserve) without revealing the message. However, because of the time consumed by the zero-knowledge proof algorithm, there has been an issue where the time to generate the transaction is significantly prolonged.

SUMMARY

Technical Problem

An object of the present invention is to provide a method of performing a contract of a plurality of reserves with single transaction using a Pedersen commitment and cc-SNARK.

Another object of the present invention is to provide a method of performing verification for a plurality of contracted reserves using a Pedersen commitment.

Technical Solution

A reserve contract method performed by at least one processor, according to an embodiment of the present disclosure may include receiving a plurality of contract requests for a plurality of reserves; obtaining, using a verify key, a mid-large commit value based on the plurality of reserves and a plurality of random values; generating a hash value based on the mid-large commit value; generating a large reserve value from the plurality of reserves based on the hash value; generating a large random value from the plurality of random values based on the hash value; obtaining, using a zero-knowledge proof algorithm, a proof value using the mid-large commit value, the large reserve value, and the large random value; transmitting the proof value as a transaction. The mid-large commit value may have a Pedersen commitment format.

According to an embodiment, the obtaining the mid-large commit value may include obtaining the plurality of random values respectively corresponding to the plurality of contract requests from a reserve database; and obtaining the mid-large commit value by exponentiating each of a plurality of key values included in the verify key by the plurality of reserves and the plurality of random values.

According to an embodiment, the plurality of contract requests may include a first contract request and a second contract request. By a first reserve $m_0$ and a first random value $r_0$ corresponding to the first contract request, a second reserve $m_1$ and a second random value $r_1$ corresponding to the second contract request, and a third key value $g_3$, a fourth key value $g_4$, a fifth key value $g_5$, and a sixth key value $g_6$ included in the verify key, the mid-large commit value $CM_{mid}$ may be generated based on the following Equation.

$$CM_{mid} = g_3^{m_0} \cdot g_4^{r_0} \cdot g_5^{m_1} \cdot g_6^{r_1}$$

According to an embodiment, the reserve contract method may further include obtaining random values corresponding to the plurality of contract requests based on a reserve database; obtaining, using the verify key, a plurality of commit values respectively corresponding to the plurality of reserves; and transmitting the transaction including the plurality of commit values.

According to an embodiment, the plurality of contract requests may include a first contract request and a second contract request. by a first reserve $m_0$ and a first random value $r_0$ corresponding to the first contract request, a second reserve $m_1$ and a second random value $r_1$ corresponding to the second contract request, and a first key value $g_1$ and a second key value $g_2$ included in the verify key, a first commit value $cm_0$ corresponding to the first contract request and a second commit value $cm_1$ corresponding to the second contract request may be generated based on the following Equation.

$$cm_0 = g_1^{m_0} \cdot g_2^{r_0}$$
$$cm_1 = g_1^{m_1} \cdot g_2^{r_1}$$

According to an embodiment, a reserve database may include information about address, reserve value, random value, and commit value for a plurality of accounts.

According to an embodiment, the reserve contract method may further include obtaining the address corresponding to the plurality of contract requests from the reserve database; and transmitting the transaction including the address.

According to an embodiment, the generating the large reserve value from the plurality of reserves may include exponentiating the hash value to correspond to an index binary for each of the plurality of reserves; and obtaining the large reserve value by multiplying each of the plurality of reserves by the exponentiated hash value.

According to an embodiment, the plurality of reserves may include a first reserve $m_0$, a second reserve $m_1$, a third reserve $m_2$, and a fourth reserve $m_3$. The large reserve value $M$ with respect to the hash value $\gamma$ may be generated based on the following Equation.

$$M = m_0 + \gamma \cdot m_1 + \gamma^2 \cdot m_2 + (\gamma + \gamma^2) \cdot m_3$$

According to an embodiment, the generating the large random value from the plurality of random values may include exponentiating the hash value to correspond to an index binary for each of the plurality of random values; and obtaining the large random value by multiplying each of the plurality of random values by the exponentiated hash value.

According to an embodiment, the plurality of random values may include a first random value $r_0$, a second random value $r_1$, a third random value $r_2$, and a fourth random value $r_3$. The large random value R with respect to the hash value $\gamma$ may be generated based on the following Equation.

$$R = r_0 + \gamma \cdot r_1 + \gamma^2 \cdot r_2 + (\gamma + \gamma^2) \cdot r_3$$

A reserve contract method performed by at least one processor, according to an embodiment of the present disclosure may include receiving a transaction corresponding to a plurality of contract requests; obtaining a hash value using a mid-large commit value included in the transaction; obtaining a high-large commit value using the hash value; obtaining a low-large commit value using the hash value; obtaining a large commit value based on the high-large commit value, the mid-large commit value, and the low-large commit value; verifying integrity of the large commit value using a zero-knowledge proof algorithm; and updating a commit value list using a plurality of commit values included in the transaction when the integrity is verified.

According to an embodiment, the obtaining the high-large commit value using the hash value may include obtaining the high-large commit value by exponentiating a verify key by the power of the hash value.

According to an embodiment, the obtaining the low-large commit value using the hash value may include obtaining a plurality of commit values from the transaction; exponentiating the hash value to correspond to an index binary for each of the plurality of commit values; and obtaining, using a tree structure, the low-large commit value by exponentiating each of the plurality of commit values by the power of the exponentiated hash value.

According to an embodiment, the plurality of commit values comprises a first commit value $cm_0$, a second commit value $cm_1$, a third commit value $cm_2$, and a fourth commit value $cm_3$. The low-large commit value $CM_{low}$ with respect to the hash value $\gamma$ may be generated based on the following Equation.

$$CM_{low} = cm_0 \cdot cm_1^{\gamma} \cdot cm_2^{\gamma^2} \cdot cm_3^{(\gamma + \gamma^2)}$$

According to an embodiment, the obtaining the low-large commit value may include sequentially arranging the plurality of commit values at a leaf node of the tree structure; exponentiating commit values connected to a node having an even index among i-th (i is a natural number) level nodes of the tree structure by the power of the hash value correspond to the level of tree structure; and obtaining the low-large commit value by multiplying all the exponentially multiplied commit values.

According to an embodiment, the transaction may include an address. The updating the commit value list may include updating, using the plurality of commit values, original commit values included in the address of the commit value list.

BRIEF DESCRIPTION OF THE DRAWINGS

FIG. 2 is a flowchart illustrating a reserve contract method according to an example embodiment.

FIG. 6 is a flowchart illustrating a reserve contract method according to an example embodiment.

DETAILED DESCRIPTION

Figure 1:
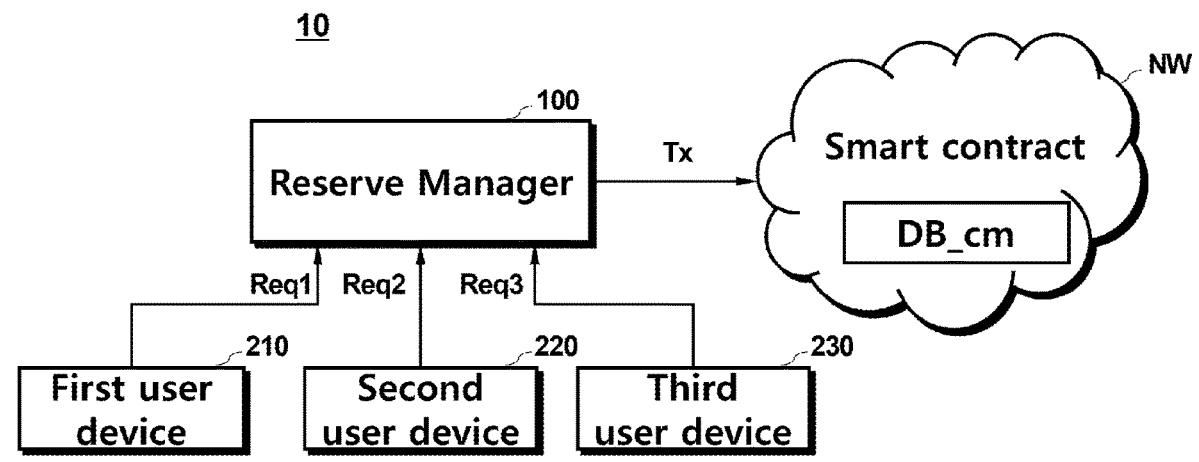
FIG. 1 is a block diagram illustrating a reserve managing system according to an example embodiment.

Hereinafter, exemplary embodiments of the present disclosure will be described in detail with reference to the accompanying drawings. Advantages and features of the present invention and methods of achieving the same will become apparent with reference to embodiments described in detail below together with the accompanying drawings. However, the technical spirit of the present invention is not limited to the following embodiments, but may be implemented in various different forms, and the following embodiments are provided to complete the technical spirit of the present invention and to completely inform a person having ordinary skill in the art to which the present invention belongs of the scope of the present invention, and the technical spirit of the present invention is only defined by the scope of Claims.

In adding reference numerals to elements in each drawing, it should be noted that the same elements will be designated by the same reference numerals, if possible, although they are shown in different drawings. In addition, in describing the present invention, when it is determined that a detailed description of related known features or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the specification, a singular form includes a plural form unless specifically mentioned in the text.

In addition, in describing the feature element of the present invention, terms such as first, second, A, B, (a), (b), and the like may be used. The term is used only to distinguish the feature element from other feature elements, and the nature, sequence, or order of the corresponding feature element is not limited by the term. When a feature element is described as being "connected," "coupled," or "connected" to another element, the feature element may be directly connected or connected to the other element, but it should be understood that another feature element may be "connected," "coupled," or "connected" between each feature element.

It will be further understood that the terms "comprises" and/or "comprising" used in the present invention do not preclude the presence or addition of one or more other feature elements, steps, operations, and/or elements in the presence of stated feature elements, steps, operations, and/or elements.

A component included in any one embodiment and a feature element including a common function may be described using the same name in another embodiment. Unless otherwise stated, the description described in any one embodiment may be applied to other embodiments, and a detailed description may be omitted within a redundant range or a range that can be clearly understood by a skilled person in the art in the art.

Hereinafter, the present invention will be described in detail with reference to preferred embodiments of the present invention and the accompanying drawings.

FIG. 1 is a block diagram illustrating a reserve managing system according to an example embodiment.

Referring to FIG. 1, a reserve managing system 10 may perform a contract for a reserve, perform an audit or verification for the contracted reserve, and for this, may include a Reserve manager 100, a smart contract NW, and a plurality of user devices 210 to 230.

A Reserve manager 100 may be operated by an entrust institution that remits a reserve and manages the entrusted reserve, and in an example, the entrust institution may include a bank and an exchange. In addition, in the present specification, a reserve may refer to a financial asset or a physical asset deposited or entrusted to an entrust institution as an asset owned by the user, and in an embodiment, may refer to a deposit. The user devices 210 to 230 may entrust a reserve owned by the user to an entrust institution operating the Reserve manager 100.

The Reserve manager 100 and the user devices 210 to 230 may include various communication terminal devices such as a cellular phone, a smart phone, a laptop, a personal computer (PC), a navigation, a personal communication system (PCS), a global system for mobile communications (GSM), a personal digital cellular (PDC), a personal handphone system (PHS), a personal digital assistant (PDA), an international mobile telecommunication (IMT)-2000, a code division multiple access (CDMA)-2000, a W-code division multiple access (W-CDMA), a wireless band Internet (Wibro) terminal, a smart pad, a tablet PC, etc. In another example, the Reserve manager 100 and the user devices 210 to 230 may be implemented as a server.

The Reserve manager 100 and the user devices 210 to 230 may be connected to each other through a smart contract NW that may communicate with each other by wire or wirelessly, and when they are connected to each other by wire, the smart contract NW may use a serial method, and when they are connected wirelessly, the smart contract NW may communicate with each other by using a wireless communication network. The wireless communication network includes, but is not limited to, a Local Area Network (LAN), a Wide Area Network (WAN), the World Wide Web (WWW), a wired/wireless data communication network, a telephone network, a wired/wireless television communication network, 3G, 4G, 5G, 3rd Generation Partnership Project (3GPP), 5th Generation Partnership Project (5GPP), Long Term Evolution (LTE), World Interoperability for Microwave Access (WIMAX), Wi-Fi, the Internet, a Local Area Network (LAN), a Wireless Local Area Network (Wireless LAN), a Wide Area Network (WAN), a Personal Area Network (PAN), a Radio Frequency (RF), a Bluetooth network, a Near-Field Communication (NFC) network, a satellite broadcasting network, an analog broadcast network, a Digital Multimedia Broadcasting (DMB) network, a Chain Network, and the like.

The user devices 210 to 230 may have a unique account (for example, a bank account) and may deposit a reserve in their own account. In an embodiment, the user devices 210 to 230 may transmit contract requests Req1 to Req3 to the Reserve manager 100 to deposit the reserve or update the reserve. In an example, the first contract request Req1 may be a request for additionally depositing a reserve, the second contract request Req2 may be a request for withdrawing a reserve, and the third contract request Req3 may be a request for newly depositing a reserve.

The Reserve manager 100 may obtain a commit value corresponding to the reserve based on the contract requests Req1 to Req3 of the user devices 210 to 230. In the present specification, the commit value may mean a value converted in a Pedersen commitment format based on a reserve, a verify key ck, and a random value.

In an embodiment, the Reserve manager 100 may perform a zero-knowledge proof algorithm on the reserves during the contract process. In the present specification, the zero-knowledge proof method is a method of verifying an integrity of a message without checking the message (for example, a reserve/commit value), and in an example, zero-knowledge SNARK (zk-SNARK), commit carrying SNARK (cc-SNARK), and Groth 16 may be used as the zero-knowledge proof method.

The Reserve manager 100 may generate one proof value using a plurality of reserves respectively corresponding to a plurality of contract requests. In an embodiment, the Reserve manager 100 may obtain the mid-large commit value using the verify key and the plurality of reserves, and generate one proof value based on the mid-large commit value. Also, the Reserve manager 100 may transmit a transaction including one proof value, a plurality of commit values, and an address to the smart contract. The verify key may be generated by using Groth 16 key generation algorithm along with proving key.

According to the inventive concept, one proof value corresponding to a plurality of reserves may be generated instead of one proof value corresponding to one reserve. As a result, a time taken to generate the proof value may be significantly reduced, and a high-speed transaction may be possible.

The smart contract NW may receive the transaction tx, verify the integrity of the plurality of commit values included in the transaction tx by using the proof value included in the transaction tx, and update the commit value list DB_cm by using the plurality of commit values when the integrity is verified.

According to an exemplary embodiment of the present disclosure, the smart contract NW may verify a plurality of commit values at a time using a large commit value corresponding to a plurality of reserves, and as a result, a time required for verification may be reduced.

The reserve managing system 10 may upload a commit value having a Pedersen commitment format, which has an exponentiated format of the verify key, to the smart contract NW. In addition, the reserve managing system 10 may verify the reserve of the Reserve manager 100 based on an additively homomorphic property of the Pedersen commitment format. According to this verification method, an audit function for the Reserve manager 100 may be improved, and the reserve of the user devices 210 to 230 may be fully entrusted.

In the present specification, the operation of the Reserve manager 100 and the user devices 210 to 230 may mean an operation performed by a processor included in each feature, based on a computer program including at least one instruction stored in a storage device included in each feature, and the storage device may include a non-volatile memory, a volatile memory, a flash memory, a hard disk drive (HDD), a solid state drive (SSD), or the like. The processor may include at least one of a Central Processing Unit (CPU), a Graphic Processing Unit (GPU), a Neural Processing Unit (NPU), a RAM, a ROM, a system bus, and an application processor. In addition, the operation of the smart contract NW may represent the operation of software and hardware features constituting the blockchain constituting the smart contract.

FIG. 2 is a flowchart illustrating a reserve contract method according to an example embodiment. In detail, FIG. 2 may be a reserve contract method performed by a Reserve manager 100.

Referring to FIG. 2, the Reserve manager 100 may receive a plurality of contract requests Req1 to Req3 from the plurality of user devices 210 to 230, step S110. Each of the contract requests Req1 to Req3 may correspond to a reserve.

The Reserve manager 100 may obtain a plurality of random values based on a previously stored reserve database, step S120. In an embodiment, the reserve database may include information on an address, a reserve, a random value, and a commit value respectively corresponding to the user account, and the random value may be determined differently for each user account.

The Reserve manager 100 may obtain the mid-large commit value based on the plurality of reserves and the plurality of random values using a verify key, step S130. In an embodiment, the verify key may be a previously published key, and may include a plurality of key values. In an embodiment, the mid-large commit value may have the Pedersen commitment format as it is determined in an exponentiation format of reserves and random values for each of the plurality of key values. In an example, a mid-large commit value $CM_{mid}$ with respect to a natural number n, a plurality of key values $g_3 \sim g_{2n+2}$ included in a verify key, a plurality of reserves $m_0 \sim m_{n-1}$, and a plurality of random values $r_0 \sim r_{n-1}$ may be determined as in Equation 1 below.

$$CM_{mid} = g_3^{m_0} \cdot g_4^{r_0} \cdot g_5^{m_1} \cdot g_6^{r_1} \cdots g_{2n+1}^{m_{n-1}} \cdot g_{2n+2}^{r_{n-1}} \qquad \text{[Equation 1]}$$

In an example, the verify key may include a plurality of key values $g_1$ to $g_{2n+3}$, and the reserve contract method according to the present specification may be performed by using at least some of the plurality of key values. Also, the verify key may be a public key.

The Reserve manager 100 may obtain a hash value through hash for the mid-large commit value, step S140, and obtain a large reserve value and a large random value based on the acquired hash value, steps S150 and S160. In addition, the Reserve manager 100 may obtain a proof value using the mid-large commit value, the large reserve value, and the large random value by using the zero-knowledge proof algorithm, step S170. In an embodiment, the mid-large commit value, the large reserve value, and the large random value may all have the Pedersen commitment format, and the Reserve manager 100 may obtain the proof value at a high speed as using the CC-SNARK.

The Reserve manager 100 may obtain a plurality of commit values respectively corresponding to a plurality of reserves by using the verification key, step S180. In an example, an i-th commit value $cm_i$ with respect to a natural number i, a first key value $g_1$, a second key value $g_2$, an i-th reserve $m_i$, and an i-th random value $r_i$ included in the verify key may be determined as in Equation 2 below. The commit values may represent reserves stored in smart contracts.

$$cm_i = g_1^{m_i} \cdot g_2^{r_i} \qquad \text{[Equation 2]}$$

The Reserve manager 100 may generate a plurality of commit values respectively corresponding to a plurality of contract requests using Equation 2. In addition, the Reserve manager 100 may obtain a plurality of addresses respectively corresponding to a plurality of reserves by using the reserve database. The Reserve manager 100 may transmit the transaction tx including the obtained address, the plurality of commit values, and the proof value to the smart contract NW, step S190.

According to an embodiment of the present disclosure, by generating one mid-large commit value corresponding to a plurality of reserve, and generating single transaction using the mid-large commit value, a commit value list may be updated on a smart contract using the single transaction even if there are a plurality of contract requests, and as a result, a high-speed transaction may be possible.

Figure 3:
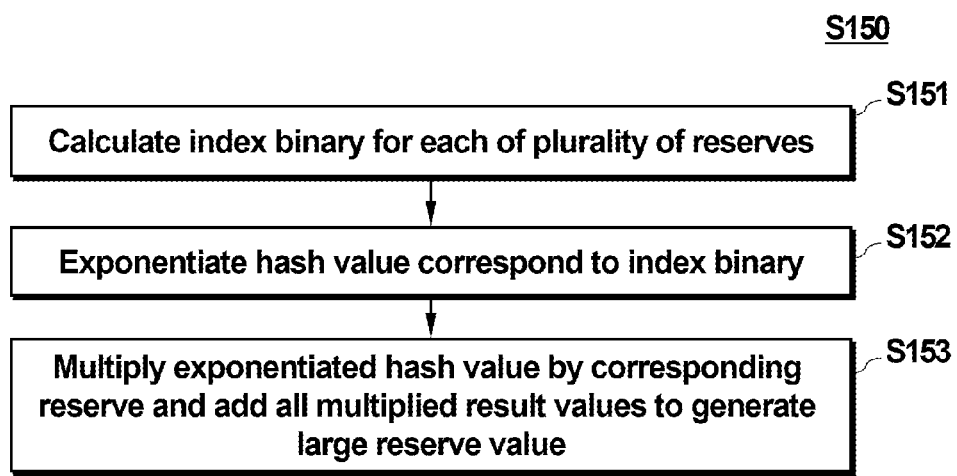
FIG. 3 is a flowchart illustrating a reserve contract method according to an example embodiment.

FIG. 3 is a flowchart illustrating a reserve contract method according to an example embodiment. In detail, FIG. 3 may show in detail the large reserve value obtaining step S150 of FIG. 2.

Referring to FIG. 3, the Reserve manager 100 may calculate an index binary for each of a plurality of reserves, step S151. In the present specification, the binary may mean a value obtained by expressing a decimal number as a binary number. For example, the Reserve manager 100 may calculate "0" as an index binary for a reserve $m_0$ having an index of 0, may calculate "1" as an index binary for a reserve $m_1$ having an index of 1, may calculate "10" as an index binary for a reserve $m_2$ having an index of 2, may calculate "11" as an index binary for a reserve $m_3$ having an index of 3, may calculate "100" as an index binary for a reserve $m_4$ having an index of 4, and may calculate "101" as an index binary for a reserve $m_5$ having an index of 5.

The Reserve manager 100 may exponentiate hash value $\gamma$ to correspond to the index binary, step S152. The Reserve manager 100 may calculate "1" corresponding to a reserve $m_0$ having an index binary of "0", calculate "$\gamma$" corresponding to a reserve $m_1$ having an index binary of "1", calculate "$\gamma^2$" corresponding to a reserve $m_2$ having an index binary of "10", calculate "$\gamma^2 + \gamma$" corresponding to a reserve $m_3$ having an index binary of "11", calculate "$\gamma^4$" corresponding to a reserve $m_4$ having an index binary of "100", and calculate "$\gamma^4 + \gamma$" corresponding to a reserve $m_5$ having an index binary of "101".

The Reserve manager 100 may multiply the exponentiated hash value by the corresponding reserve and add all the multiplied result values to generate a large reserve value, step S153. In an example, a large reserve value M with respect to a hash value $\gamma$ and reserves $m_0$ to $m_5$ may be determined as in Equation 3 below.

$$M = m_0 + \gamma \cdot m_1 + \gamma^2 \cdot m_2 + \qquad \text{[Equation 3]}$$
$$\left(\gamma + \gamma^2\right) \cdot m_3 + \left(\gamma^4\right) \cdot m_4 + \left(\gamma + \gamma^4\right) \cdot m_5$$

According to an embodiment of the disclosure, by generating a large reserve value based on an index binary, a reserve contract method capable of increasing an operation speed by using a tree structure in a verification process while reserves are classified into hash values may be provided.

Although FIG. 3 illustrates six reserves for convenience of description, it is apparent that the embodiment of the present disclosure may be applied to an example of generating a large-reserve value using more or less than six reserves.

Figure 4:
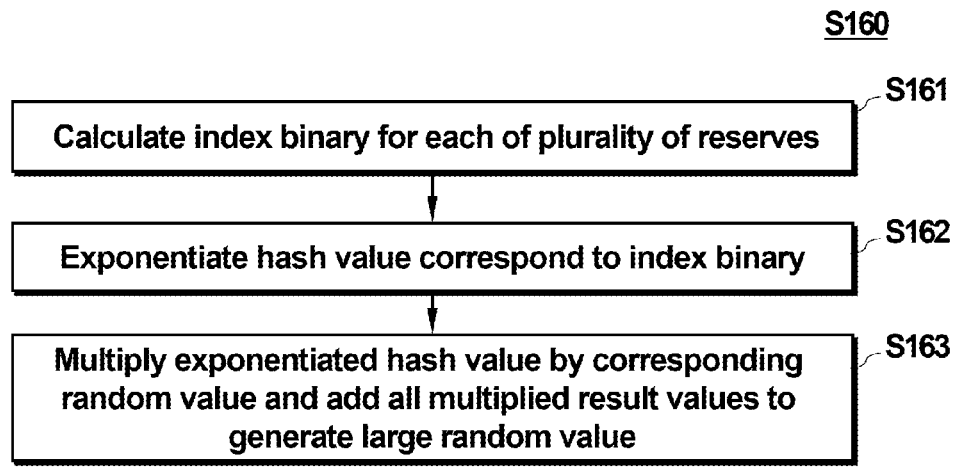
FIG. 4 is a flowchart illustrating a reserve contract method according to an example embodiment.

FIG. 4 is a flowchart illustrating a reserve contract method according to an example embodiment. In detail, FIG. 4 may show the large random value obtainment step S160 of FIG. 2 in detail.

Referring to FIG. 4, the Reserve manager 100 may calculate an index binary for each of a plurality of reserves, step S161. The index binary calculation step S161 may be the same as or similar to the index binary calculation step S151 described in FIG. 3.

The Reserve manager 100 may exponentiate hash value $\gamma$ to correspond to the index binary, step S162. The hash value calculation step S162 may be the same as or similar to the hash value calculation step S152 described in FIG. 3.

The Reserve manager 100 may multiply the exponentiated hash value by the corresponding random value and add all the multiplied result values to generate a large random value, step S163. In an example, the large random value R with respect to the hash value $\gamma$ and the random values $r_0$ to $r5$ may be determined as in Equation 4 below.

$$R = r_0 + \gamma \cdot r_1 + \gamma^2 \cdot r_2 + \left(\gamma + \gamma^2\right) \cdot r_3 + \left(\gamma^4\right) \cdot r_4 + \left(\gamma + \gamma^4\right) \cdot r_5 \qquad \text{[Equation 4]}$$

According to an exemplary embodiment of the present disclosure, by generating a large random value based on an index binary, a reserve contract method capable of increasing an operation speed by using a tree structure in a verification process while random values are divided into hash values may be provided.

Although FIG. 4 illustrates six random values, this is merely an example for convenience of description, and it is apparent that the embodiment of the present disclosure may also be applied to an example of generating a large random value using more or less than six random values.

Figure 5:
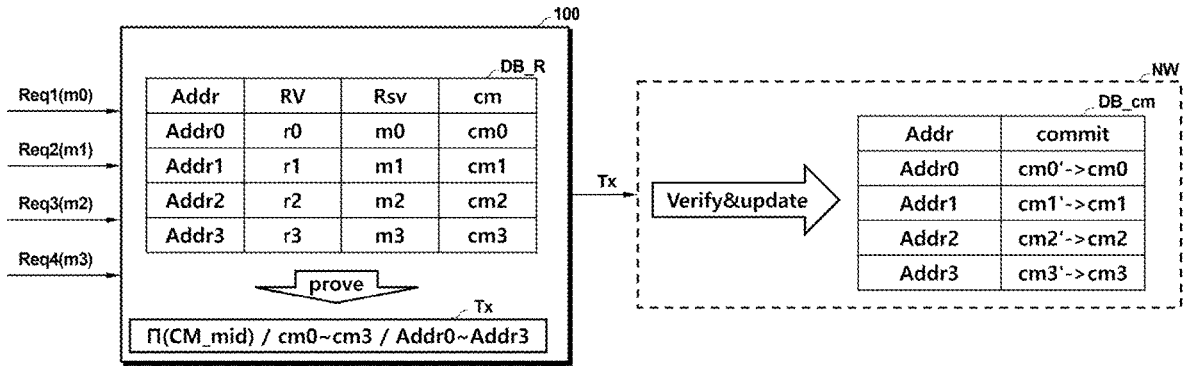
FIG. 5 is a diagram illustrating a reserve contract method according to an example embodiment.

FIG. 5 is a diagram illustrating a reserve contract method according to an example embodiment.

Referring to FIG. 5, the Reserve manager 100 may receive a plurality of contract requests Req1 to Req4 respectively corresponding to a plurality of reserves $m_0$ to $m_3$ from a plurality of user devices. The Reserve manager 100 may update the reserve database DB_R based on the account of the user device that has received the contract request. In an example, the Reserve manager 100 may update the reserve $m_0$ corresponding to an address Addr0 in response to the first contract request Req1 and update the commit value $cm_0$ in response to the reserve $m_0$. Similarly, the Reserve manager 100 may update the plurality of reserves $m_1$ to $m_3$ and the plurality of commit values $cm_1$ to $cm_3$.

The Reserve manager 100 may generate the mid-large commit value CM_mid based on the plurality of reserves Rsv and the plurality of random values RV, and may generate a proof value $\pi$ based on the mid-large commit value CM_mid. The Reserve manager 100 may generate the proof value $\pi$, the plurality of commit values emo to $cm_3$, and a plurality of addresses Addr0 to Addr3 as a transaction tx, and transmit the generated transaction tx to the smart contract NW.

The smart contract NW or nodes constituting the smart contract NW may verify the transaction tx, and when the integrity of the proof value $\pi$ and the plurality of verification values $cm_0$ to $cm_3$ is verified as a result, the plurality of commit values $cm_0$ to $cm_3$ of the commit value list DB_cm may be updated based on the addresses Addr0 to Addr3 included in the transaction tx.

According to the inventive concept, by proving and verifying a plurality of commit values through single transaction, and updating a plurality of verified commit values on a smart contract, a large number of contract requests may be rapidly performed through the single transaction.

FIG. 6 is a flowchart illustrating a reserve contract method according to an example embodiment. In detail, FIG. 6 illustrates a method of verifying the integrity of the proof value $\pi$ using the transaction tx in the smart contract NW.

Referring to FIG. 6, the smart contract NW may receive the transaction tx, step S210, and may obtain a hash value by using the mid-large commit value included in the transaction tx, step S220. In an embodiment, the smart contract NW may obtain a hash value by hashing the mid-large commit value.

The smart contract NW may obtain a high-large commit value and a low-large commit value using the hash value, steps S230 and S240. In an example, the smart contract NW may calculate a high-large commit value $CM_{high}$ with respect to the hash value $\gamma$ and the high key value $g_{2n+3}$ among the verify key, as shown in Equation 5 below.

$$CM_{high} = g_{2n+3}^{\gamma} \qquad \text{[Equation 5]}$$

The smart contract NW may obtain a large commit value by using the high-large commit value, the mid-large commit value, and the low-large commit value, step S250. In an example, in the high-large commit value $CM_{high}$, the mid-large commit value $CM_{mid}$, and the low-large commit value $CM_{low}$, the smart contract NW may calculate the large commit value CM according to Equation 6 below.

$$CM = CM_{low} + CM_{mid} + CM_{high} \qquad \text{[Equation 6]}$$

The smart contract NW may verify the integrity of the large commit value CM by using a zero-knowledge proof algorithm (for example, Groth 16), step S260. When the integrity of the large commit value CM is verified, the smart contract NW may update the commit value list DB_cm using the plurality of commit values included in the transaction tx, step S270.

According to an exemplary embodiment of the present disclosure, by verifying the integrity of the transaction tx by using the large commit value generated based on the mid-large commit value corresponding to the plurality of reserves, verification for a large number of commit values may be performed by using one mid-large commit value, and as a result, the speed of the verification process may be increased.

Figure 7:
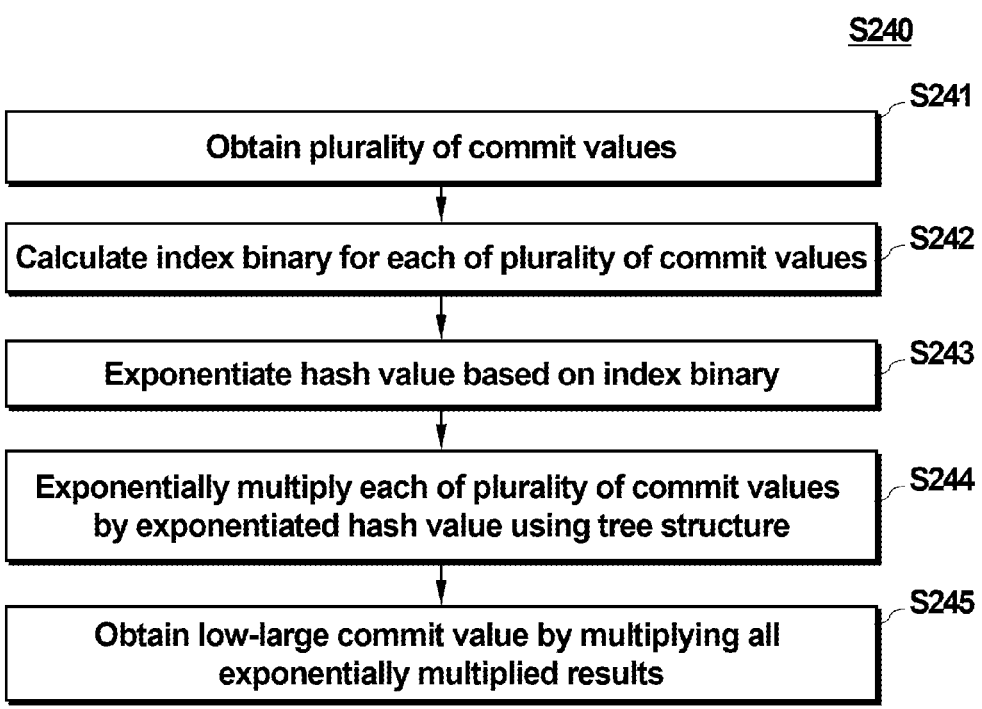
FIG. 7 is a flowchart illustrating a reserve contract method according to an example embodiment.

FIG. 7 is a flowchart illustrating a reserve contract method according to an example embodiment. In detail, FIG. 7 illustrates the low-large commit value generation step S240 using the hash value in the smart contract NW.

Referring to FIG. 7, the smart contract NW may obtain a plurality of commit values, step S241, and calculate an index binary for each of the plurality of commit values, step S242. The index binary calculation step S242 may be the same as or similar to the index binary calculation step S151 described in FIG. 3.

The smart contract NW may exponentiate the hash value $\gamma$ to correspond to the index binary, step S243. The hash value calculation step S243 may be the same as or similar to the hash value calculation step S152 described in FIG. 3.

The smart contract NW may exponentiate each of the plurality of commit values by the power of the exponentiated hash value using the tree structure, step S244. In addition, the smart contract may obtain a low-large commit value by multiplying all exponentially multiplied results, step S245. In an example, the low-large commit value $CM_{low}$ with respect to the hash value $\gamma$ and the commit values $cm_0$ to $cm_5$ may be determined as in Equation 7 below.

$$CM_{low} = cm_0 \cdot cm_1^{\gamma} \cdot cm_2^{\gamma^2} \cdot cm_3^{(\gamma+\gamma^2)} \cdot cm_4^{(\gamma^4)} \cdot cm_5^{(\gamma+\gamma^4)} \qquad \text{[Equation 7]}$$

According to an exemplary embodiment of the present disclosure, by generating a low-large commit value based on an index binary, the tree structure may be used, and a reserve contract method consequently increasing a verification speed may be provided.

Although FIG. 7 illustrates six commit values for convenience of description, the embodiment of the present disclosure may be applied to an example of generating a low-large commit value using more or less than six commit values.

Figure 8:
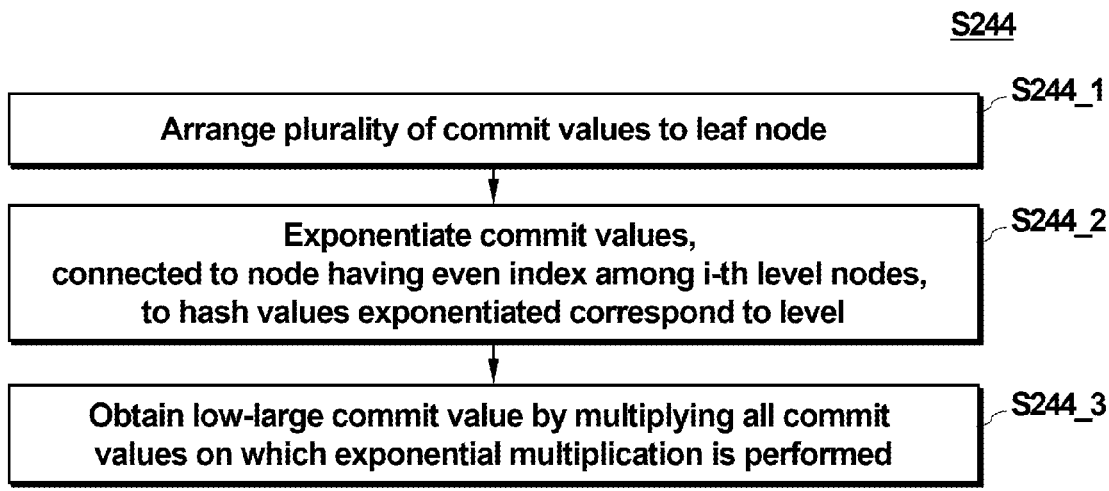
FIG. 8 is a flowchart illustrating a reserve contract method according to an example embodiment.
Figure 9:
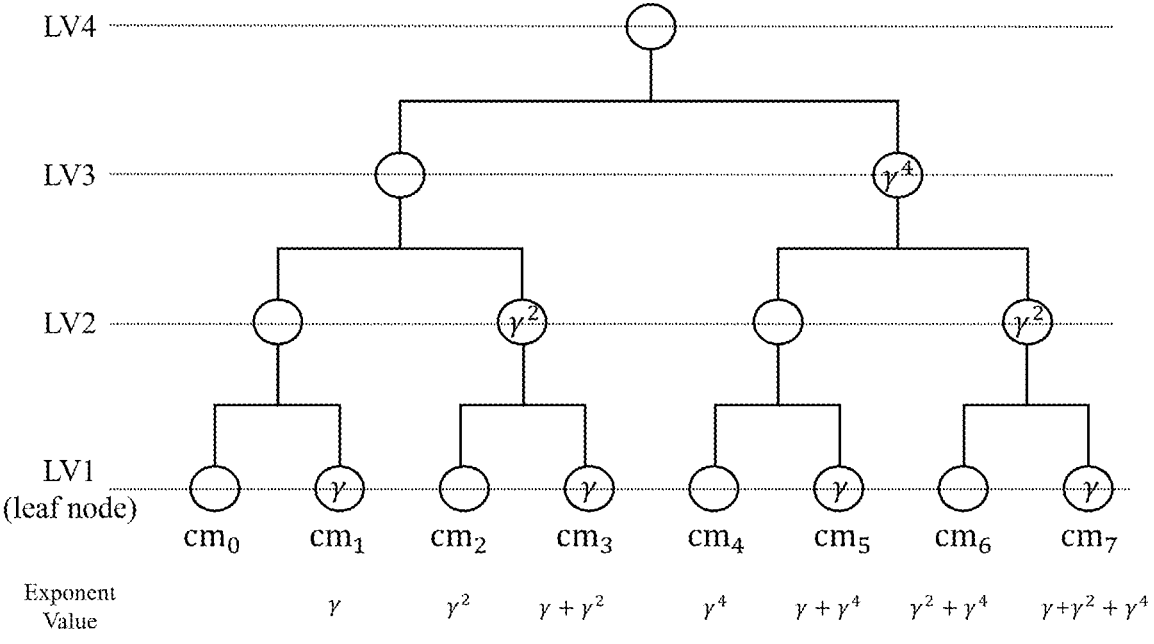
FIG. 9 is a diagram illustrating a reserved verification method using a tree structure according to an example embodiment.

FIG. 8 is a flowchart illustrating a reserve contract method according to an example embodiment, and FIG. 9 is a diagram illustrating a reserved verification method using a tree structure according to an example embodiment. FIG. 8 illustrates, in detail, exponentiation of the plurality of commit values by using the tree structure, step S244.

Referring to FIG. 8, the smart contract NW may arrange the plurality of commit values so as to sequentially correspond to the leaf node, step S244_1. In the example of FIG. 9, the plurality of commit values $cm_0$ to $cm7$ may be sequentially arranged in the leaf node, which is the lowest level, based on an index order.

Referring back to FIG. 8, the smart contract NW may exponentiate commit values connected to a node having an even index among i-th (i is a natural number) level nodes of the tree structure by the power of the hash value correspond to the level of tree structure, step S244_2.

In the example of FIG. 9, since the commit value $cm_1$ is connected only to the even node of the first level LV1, it is possible to calculate $cm_1^{\gamma}$ by exponentiating the commit value $cm_1$ by $\gamma$ which is the hash value $\gamma$ raised to the power of $1=2^0$(LV1 is zero-level). In addition, since the commit value $cm_3$ is connected to the even nodes of the first level LV1 and the second level LV2, it is possible to calculate $cm_3^{\gamma}$ by exponentiating the commit value $cm_3$ by $\gamma$ which is the hash value $\gamma$ raised to the power of $1=2^0$, and to calculate $cm_3^{\gamma^2}$ by exponentiating the commit value $cm_3$ by $\gamma^2$ which is the hash value $\gamma$ raised to the power of $2=2^1$(LV2 is $1^{st}$ level). In addition, since the commit value $cm7$ is connected to the even nodes of the first level LV1, the second level LV2, and the third level LV3, it is possible to calculate $cm_7^{\gamma}$ by exponentiating the commit value $cm7$ by $\gamma$ which is the hash value $\gamma$ raised to the power of $1=2^0$, to calculate $cm_7^{\gamma^2}$ by exponentiating the commit value $cm7$ by $\gamma^2$ which is the hash value $\gamma$ raised to the power of $2=2^1$, and to calculate $cm_7^{\gamma^4}$ by exponentiating the commit value $cm7$ by $\gamma^4$ which is the hash value $\gamma$ raised to the power of $4=2^2$(LV3 is $2^{nd}$ level). All exponentiation operations of all commit values $cm_0$ to $cm7$ may be performed in a similar method.

Referring back to FIG. 8, the smart contract NW may obtain a low-large commit value by multiplying all commit values on which the exponential multiplication is performed, step S244_3.

The exponential multiplication of the commit value may require a long time in the verification process as a higher calculation amount is required as the order of the exponent becomes higher. According to an embodiment of the present invention, by converting a hash value into an index binary format, and calculating a low-large commit value by using a tree structure which may be used in the index binary format, as a result, preventing an index order of the commit value from being excessively increased may be possible, and as an amount of calculation is minimized, verification may be rapidly performed.

Figure 10:
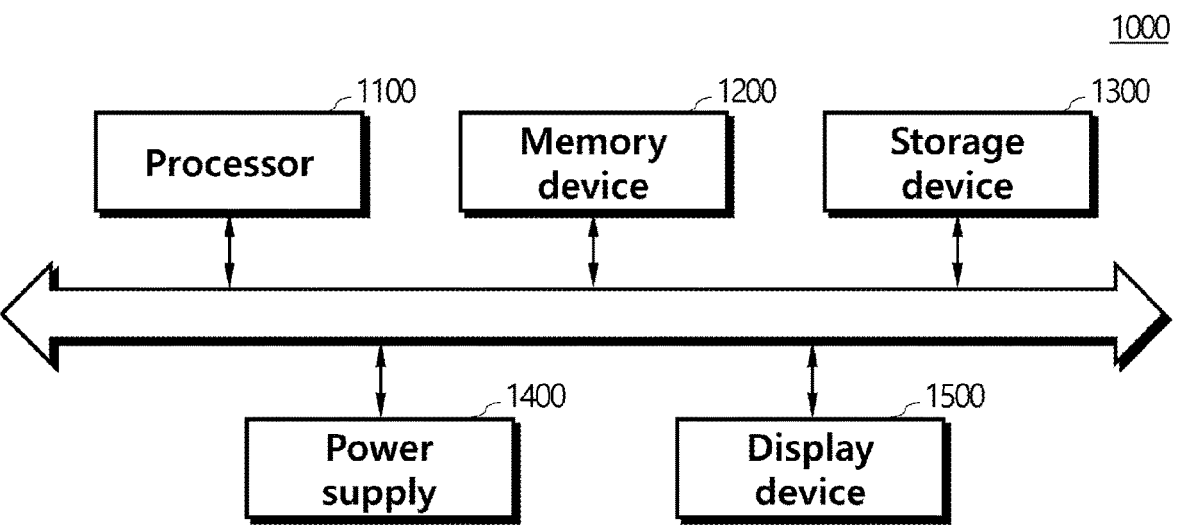
FIG. 10 is a block diagram of a computing system according to an example embodiment.

FIG. 10 is a block diagram of a computing system according to an example embodiment.

Referring to FIG. 10, the computing system 1000 may be one of the Reserve managers 100 and the user devices 210 to 230, and may include a processor 1100, a memory device 1200, a storage device 1300, a power supply 1400, and a display device 1500. Although not illustrated in FIG. 10, the computing system 1000 may further include ports for communicating with a video card, a sound card, a memory card, a universal serial bus (USB) device, other electronic devices, etc.

As described above, the processor 1100, the memory device 1200, the storage device 1300, the power supply 1400, and the display device 1500 included in the computing system 1000 may configure any one of the Reserve managers 100 and the user devices 210 to 230 according to embodiments of the inventive concept to perform a reserve contract method and a reserve verification method. In detail, the processor 1100 may perform the reserve contract method and the reserved verification method described with reference to FIGS. 1 to 9 by controlling the memory device 1200, the storage device 1300, the power supply 1400, and the display device 1500.

The processor 1100 may perform various computing functions. The processor 1100 may be a microprocessor or a Central Processing Unit (CPU). The processor 1100 may communicate with the memory device 1200, the storage device 1300, and the display device 1500 through a bus such as an address bus, a control bus, or a data bus. According to an embodiment, the processor 1100 may be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM, and/or an MRAM. The storage device 1300 may include a solid state drive, a hard disk drive, a CD-ROM, etc. The storage device 1300 may store programs, application program data, system data, operating system data, etc., which are related to the reserve contract method and the reserved verification method described with reference to FIGS. 1 to 9.

The display device 1500 is an output means for notifying a user, and may notify a user or the like of information on a method of forming a virtual private network by displaying the information on the method. The power supply 1400 may supply an operating voltage required for an operation of the computing system 1000.

According to the technical concept of the present invention, a plurality of reserves is contrasted through single transaction using a Pedersen commitment, and verification for the plurality of reserves is also performed using the properties of the Pedersen commitment, so that the process of performing the contract and verification may be smoothly performed while dramatically increasing a transaction generation speed corresponding to one reserve.

Exemplary embodiments have been invented in the drawings and specification as described above. Although the embodiments are described using specific terms in the specification, they are used only for the purpose of describing the technical spirit of the present invention and are not used to limit the meaning or the scope of the present invention described in Claims. Therefore, those skilled in the art will understand that various modifications and other equivalent embodiments are possible therefrom. Therefore, the true technical protection scope of the present invention should be determined by the technical spirit of the appended claims.

This work (patent) was supported by Institute of Information & communications Technology Planning & Evaluation (IITP) grant funded by the Korea Government (MSIT) (No. 2021-0-00532-003, Project Name: Blockchain Technology Development for IITP Data Economy, Task Name: Blockchain scalability solutions supporting high performance capacity transactions, Contribution Rate: 100%)

What is claimed is:

1. A reserve contract method performed by at least one processor, the reserve contract method comprising:

receiving a plurality of contract requests for a plurality of reserves;

obtaining, using a verify key, an aggregated commit value by aggregating the plurality of reserves and a plurality of random values;

generating a hash value $\gamma$ based on the aggregated commit value;

generating an aggregated reserve value by aggregating the plurality of reserves based on the hash value $\gamma$;

generating an aggregated random value by aggregating the plurality of random values based on the hash value $\gamma$;

obtaining, using zk-SNARK, a proof value using the aggregated commit value, the aggregated reserve value, and the aggregated random value;

transmitting the proof value as a transaction, and depositing the plurality of reserves to corresponding accounts using the proof value in response to the plurality of contract requests, wherein the aggregated commit value has a Pedersen commitment format, wherein the generating the aggregated reserve value from the plurality of reserves comprises:

exponentiating the hash value $\gamma$ to a first index binary, which sequentially increases according to an order of the plurality of reserves, for each of the plurality of reserves; and obtaining the aggregated reserve value by multiplying each of the plurality of reserves by the exponentiated hash value $\gamma$ using a tree structure, wherein the plurality of reserves comprises a first reserve $m_0$, a second reserve $m_1$, a third reserve $m_2$, and a fourth reserve $m_3$, wherein the aggregated reserve value with respect to the hash value $\gamma$ is generated based on the following equation:

$$M = m_0 + \gamma \cdot m_1 + \gamma^2 \cdot m_2 + (\gamma + \gamma^2) \cdot m_3.$$

2. The reserve contract method of claim 1, wherein the obtaining the aggregated commit value comprises:

obtaining the plurality of random values respectively corresponding to the plurality of contract requests from a reserve database; and obtaining the aggregated commit value by exponentiating each of a plurality of key values included in the verify key to the power of the plurality of reserves and the plurality of random values.

3. The reserve contract method of claim 2, wherein the plurality of contract requests comprises a first contract request and a second contract request, wherein, by the first reserve $m_0$ and a first random value $r_0$ corresponding to the first contract request, the second reserve $m_1$ and a second random value $r_1$ corresponding to the second contract request, and a third key value $g_3$, a fourth key value $g_4$, a fifth key value $g_5$, and a sixth key value $g_6$ included in the verify key, the aggregated commit value is generated based on the following equation:

$$CM_{mid} = g_3^{m_0} \cdot g_4^{r_0} \cdot g_5^{m_1} \cdot g_6^{r_1}.$$

4. The reserve contract method of claim 1, further comprising:

obtaining random values corresponding to the plurality of contract requests based on a reserve database;

obtaining, using the verify key, a plurality of commit values respectively corresponding to the plurality of reserves; and transmitting the transaction including the plurality of commit values.

5. The reserve contract method of claim 4, wherein the plurality of contract requests comprises a first contract request and a second contract request, wherein, by the first reserve $m_0$ and a first random value $r_0$ corresponding to the first contract request, the second reserve $m_1$ and a second random value $r_1$ corresponding to the second contract request, and a first key value $g_1$ and a second key value $g_2$ included in the verify key, a first commit value $cm_0$ corresponding to the first contract request and a second commit value $cm1$ corresponding to the second contract request are generated based on the following equation:

$$cm_0 = g_3^{m_0} \cdot g_4^{r_0}$$

$$cm_1 = g_3^{m_0} \cdot g_4^{r_0}.$$

6. The reserve contract method of claim 1, wherein a reserve database comprises information about address, reserve value, random value, and commit value for a plurality of accounts, and the reserve contract method further comprises:

obtaining an address corresponding to the plurality of contract requests from the reserve database; and transmitting the transaction including the address.

7. The reserve contract method of claim 1, wherein the generating the aggregated random value from the plurality of random values comprises:

exponentiating the hash value $\gamma$ to a second index binary, which sequentially increases according to an order of the plurality of random values, for each of the plurality of random values; and obtaining the aggregated random value by multiplying each of the plurality of random values by the exponentiated hash value $\gamma$.

8. The reserve contract method of claim 7, wherein the plurality of random values comprises a first random value $r_0$, a second random value $r_1$, a third random value $r_2$, and a fourth random value $r_3$, wherein the aggregated random value with respect to the hash value $\gamma$ is generated based on the following equation:

$$R = r_0 + \gamma \cdot r_1 + \gamma^2 \cdot r_2 + (\gamma + \gamma^2) \cdot r_3.$$

9. A reserve contract method performed by at least one processor, the reserve contract method comprising:

receiving a transaction corresponding to a plurality of contract requests;

obtaining a hash value $\gamma$ using an aggregated commit value, which is obtained by aggregating a plurality of reserves and a plurality of random values, included in the transaction;

obtaining a first commit value using the hash value $\gamma$;

obtaining a second commit value using the hash value $\gamma$;

obtaining a third commit value based on the first commit value, the aggregated commit value, and the second commit value;

verifying an integrity of the third commit value using zk-SNARK;

updating a commit value list using a plurality of commit values included in the transaction when the integrity is verified; and depositing the plurality of reserves, each corresponding to the plurality of contract requests, to corresponding accounts using the plurality of commit values, wherein the obtaining the second commit value using the hash value $\gamma$ comprises:

obtaining the plurality of commit values from the transaction;

exponentiating the hash value $\gamma$ to a first index binary, which sequentially increases according to an order of the plurality of commit values, for each of the plurality of commit values; and obtaining, using a tree structure, the second commit value by exponentiating each of the plurality of commit values to the exponentiated hash value $\gamma$, wherein the plurality of commit values comprises a fourth commit value $cm_0$, a fifth commit value $cm_1$, a sixth commit value $cm_2$, and a seventh commit value $cm_3$, wherein the second commit value, with respect to the hash value $\gamma$, is generated based on the following equation:

$$CM_{low} = cm_0 \cdot cm_1^{\gamma} \cdot cm_2^{\gamma^2} \cdot cm_3^{(\gamma+\gamma^2)}.$$

10. The method of claim 9, wherein the transaction comprises an address of the commit value list, wherein the updating the commit value list comprises updating, using the plurality of commit values, original commit values included in the address of the commit value list.

\* \* \* \* \*